United States Patent
Kwon (10) Patent No.: US 8,006,246 B2
(45) Date of Patent: Aug. 23, 2011

(54) APPARATUS FOR FORCIBLY TERMINATING THREAD BLOCKED ON INPUT/OUTPUT OPERATION AND METHOD FOR THE SAME

(75) Inventor: Ho-bum Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1243 days.

(21) Appl. No.: 11/653,398

(22) Filed: Jan. 16, 2007

(65) Prior Publication Data

US 2007/0198980 A1 Aug. 23, 2007

(30) Foreign Application Priority Data

Feb. 22, 2006 (KR) .................. 10-2006-0017343

(51) Int. Cl.
*G06F 9/46* (2006.01)
*G06F 11/00* (2006.01)
*G06F 3/00* (2006.01)
*G06F 13/24* (2006.01)

(52) U.S. Cl. ............ 718/102; 718/103; 718/104; 714/2; 714/38.1; 714/38.13; 714/48; 714/49; 710/7; 710/18; 710/19; 710/260

(58) Field of Classification Search .................. None
See application file for complete search history.

(56) References Cited

U.S. PATENT DOCUMENTS

| | | | |
|---|---|---|---|
| 6,349,322 B1 | 2/2002 | Shaylor | 718/107 |
| 6,457,142 B1 | 9/2002 | Klemm et al. | 714/38 |
| 6,711,739 B1 | 3/2004 | Kutcher | |
| 6,832,236 B1 | 12/2004 | Hamilton et al. | 718/100 |
| 6,842,898 B1 | 1/2005 | Carlson et al. | |
| 6,886,112 B2 * | 4/2005 | Smith | 714/38.13 |
| 6,910,209 B2 * | 6/2005 | Kawahara et al. | 718/102 |
| 7,216,346 B2 * | 5/2007 | Bender et al. | 718/102 |
| 7,337,443 B2 * | 2/2008 | Welland et al. | 718/102 |
| 7,698,708 B1 * | 4/2010 | Lent et al. | 718/104 |

(Continued)

FOREIGN PATENT DOCUMENTS

JP 06-110813 A 4/1994

(Continued)

OTHER PUBLICATIONS

Office Action dated Jun. 22, 2010 from the Japanese Patent Office in Japanese counterpart Application No. 2007-040391. Japanese Office Action issued on Apr. 5, 2011 in the corresponding Japanese Patent Application No. 2007-040391.

*Primary Examiner* — Meng A An
*Assistant Examiner* — Abdullah Al Kawsar
(74) *Attorney, Agent, or Firm* — Sughrue Mion, PLLC (57) ABSTRACT

Provided are an apparatus and a method for forcibly terminating a thread blocked on an I/O operation by terminating the I/O operation, transmitting a user-defined signal to the thread blocked on the I/O operation, and temporarily releasing the corresponding thread from a blocked state such that a ThreadDeath Exception is generated with respect to the thread attempting to execute an I/O system call. The apparatus includes a control unit which checks a state of a thread that is included in an application, a signal transmitting unit which transmits a signal for releasing a blocked state of the thread, an operation managing unit which executes a first terminating function on the I/O operation that is included in the thread, and a thread managing unit which executes a second terminating function on the thread.

17 Claims, 5 Drawing Sheets

U.S. PATENT DOCUMENTS

| | | | |
|---|---|---|---|
| 2002/0161816 A1 | 10/2002 | Kawahara et al. | 709/103 |
| 2004/0139440 A1 | 7/2004 | Browning et al. | 718/107 |
| 2005/0125795 A1 | 6/2005 | Kissell | 718/100 |
| 2006/0136920 A1* | 6/2006 | Nagano et al. | 718/100 |
| 2006/0200702 A1* | 9/2006 | Canning et al. | 714/38 |

FOREIGN PATENT DOCUMENTS

| | | |
|---|---|---|
| JP | 2000-293380 A | 10/2000 |
| JP | 2003-177926 A | 6/2003 |
| JP | 2005-346457 A | 12/2005 |

\* cited by examiner

| APPLICATION IDENTIFIER | THREAD IDENTIFIER | TYPE OF I/O OPERATION | LOCATION OF I/O OPERATION | STATE |
|---|---|---|---|---|
| APPLICATION 1 | THREAD 1 | FILE | 0x0001 | 0 |
| APPLICATION 1 | THREAD 2 | NETWORK | 0x0002 | 0 |
| APPLICATION 1 | THREAD 3 | FILE | 0x0003 | 1 |
| APPLICATION 2 | THREAD 4 | FILE | 0x0004 | 1 |
| APPLICATION 2 | THREAD 5 | NETWORK | 0x0005 | 0 |
| APPLICATION 2 | THREAD 6 | NETWORK | 0x0006 | 1 |

APPARATUS FOR FORCIBLY TERMINATING THREAD BLOCKED ON INPUT/OUTPUT OPERATION AND METHOD FOR THE SAME

CROSS REFERENCE TO RELATED APPLICATION

This application claims priority from Korean Patent Application No. 10-2006-0017343 field on Feb. 22, 2006 in the Korean Intellectual Property Office, the disclosure of which is incorporated herein by reference in its entirety.

BACKGROUND OF THE INVENTION

1. Field of the Invention

Apparatuses and methods consistent with the present invention relate to forcibly terminating a thread blocked on an input/output operation. More particularly, apparatuses and methods consistent with the present invention relate to forcibly terminating a thread blocked on an input/output operation by terminating the input/output operation, transmitting a user-defined signal to the thread blocked on the input/output operation, and temporarily releasing the corresponding thread from a blocked state such that a ThreadDeath Exception is generated in the thread attempting to execute an input/output system call.

2. Description of the Related Art

Java is an object-oriented programming language that runs a written code in a platform independent manner. As used herein, the term "platform" refers to, for example, hardware on which a program executes, or a software environment such as an operating system. The code written using Java is complied as a Java byte code by a Java compiler. The Java byte code is executed by a Java virtual machine that supports a variety of hardware-based platforms.

Figure 1:
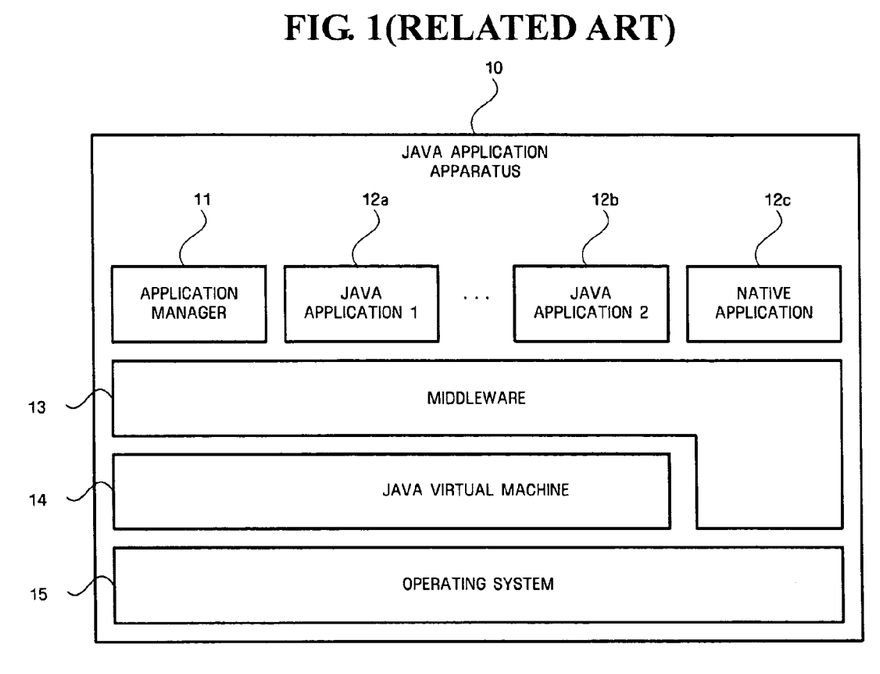
FIG. 1 is a block diagram showing an apparatus for executing a Java application according to the related art.

FIG. 1 is a block diagram showing an apparatus for executing a Java application according to the related art. A Java application apparatus 10 includes an application manager 11, applications 12a, 12b and 12c, middleware 13, a Java virtual machine 14, and an operating system 15.

As shown in FIG. 1, the applications include Java application 1, referenced as 12a, Java application 2, referenced as 12b, and a native application 12c.

The application manager 11 manages a life cycle of an application by changing a state of the application. The middleware 13, such as an open cable application platform (OCAP), an advanced open cable application platform (ACAP), or the like, manages the operation of the application.

The Java virtual machine 14 loads a class included in the application to a memory, converts an execution code of the class into a command code of the operating system 15, and manages resources that are allocated to the application.

As described above, the application manager II manages the life cycle of the application. To do so, first, the application manager 11 checks a list of threads running in the application that is desired to be terminated. When there is no thread in the list, the application manager 11 immediately terminates the application. When there are threads in the list, the application manager 111 terminates the threads that are included in the list.

In order to terminate the threads included in the list, the application manager 11 checks a thread class object of a first thread in the list and calls an interrupt function (e.g., Thread.interrupt ( )) with respect to a corresponding object. The interrupt function temporarily releases the thread from a blocked state. At this time, the application manager 11 calls a stop function (e.g., Thread.stop ( )) with respect to a corresponding object. The stop function generates a ThreadDeath Exception, such that the thread terminates. The application manager 11 repeats this process until all of the threads included in the list are terminated.

However, when there is a thread that is blocked on an input/output operation (hereinafter, simply referred to as an "I/O operation") in the application, it may be impossible for the application manager 11 to effectively terminate the corresponding thread by the interrupt function and the stop function.

In general, when a function with respect to an I/O operation is called in a Java program, the function attempts to execute an I/O system call of the operating system 15. The system call is executed in a kernel mode, in which the thread is in a blocked state, waiting for the I/O operation. However, since the interrupt function and the stop function are executed in a user mode by the application manager 11, it may be impossible for the interrupt function and the stop function to affect the thread running in the kernel mode. That is, it is not until the I/O system call is returned and the kernel mode is changed into the user mode that the thread terminates.

A method for initiating a cleanup process by monitoring a plurality of related threads in a Java virtual machine environment and of making a determination as to whether a thread within the plurality of related threads is active on the basis of the status information is disclosed in U.S. Pat. No. 6,842,898 (Method and Apparatus for Monitoring and Handling Events for a Collection of Related Threads in a Data Processing System). However, the invention disclosed in U.S. Pat. No. 6,842,898 proposes only a method for terminating a general thread, but not a method for terminating a thread that is blocked on an I/O operation.

Therefore, there is a demand for a method for effectively terminating a thread that is blocked on an I/O operation.

SUMMARY OF THE INVENTION

An aspect of the present invention is to forcibly terminate a thread blocked on an I/O operation by terminating the I/O operation, transmitting a user-defined signal to the thread blocked on the I/O operation, and temporarily releasing the corresponding thread from a blocked state such that a ThreadDeath Exception is generated in the thread attempting to execute an I/O system call.

Aspects of the present invention are not limited to those mentioned above, and other objects of the invention will be readily understood by those skilled in the art by the following description.

According to an aspect of the present invention, there is provided an apparatus for forcibly terminating a thread blocked on an I/O operation, the apparatus including a control unit checking a state of a thread that is included in an application, a signal transmitting unit transmitting a signal for releasing a blocked state to the thread, an operation managing unit executing a first terminating function of the I/O operation that is included in the thread that is released from the blocked state by the signal, and a thread managing unit executing a second terminating function of the thread whose I/O operation is terminated by the first terminating function.

According to another aspect of the present invention, there is provided a method for forcibly terminating a thread blocked on an I/O operation, the method including checking a state of a thread that is included in an application, transmitting a signal for releasing a blocked state to the thread, executing a first terminating function of the I/O operation that is included in the thread that is released from the blocked state by the signal, and executing a second terminating function of the thread whose I/O operation is terminated by the first terminating function.

BRIEF DESCRIPTION OF THE DRAWINGS

The above and other features and aspects of the present invention will become more apparent by describing in detail exemplary embodiments thereof with reference to the attached drawings, in which.

DESCRIPTION OF EXEMPLARY
EMBODIMENTS OF THE PRESENT
INVENTION

Aspects and features of the present invention and methods of accomplishing the same may be understood more readily by reference to the following detailed description of exemplary embodiments and the accompanying drawings. The present invention, however, may be embodied in many different forms and should not be construed as being limited to the exemplary embodiments set forth herein. Rather, these exemplary embodiments are provided so that this disclosure will be thorough and complete and will fully convey the concept of the present invention to those skilled in the art, and the scope of the present invention will be defined only by the appended claims. Like reference numerals refer to like elements throughout the specification.

The present invention will now be described more fully with reference to the accompanying drawings, in which exemplary embodiments of the present invention are shown.

Figure 2:
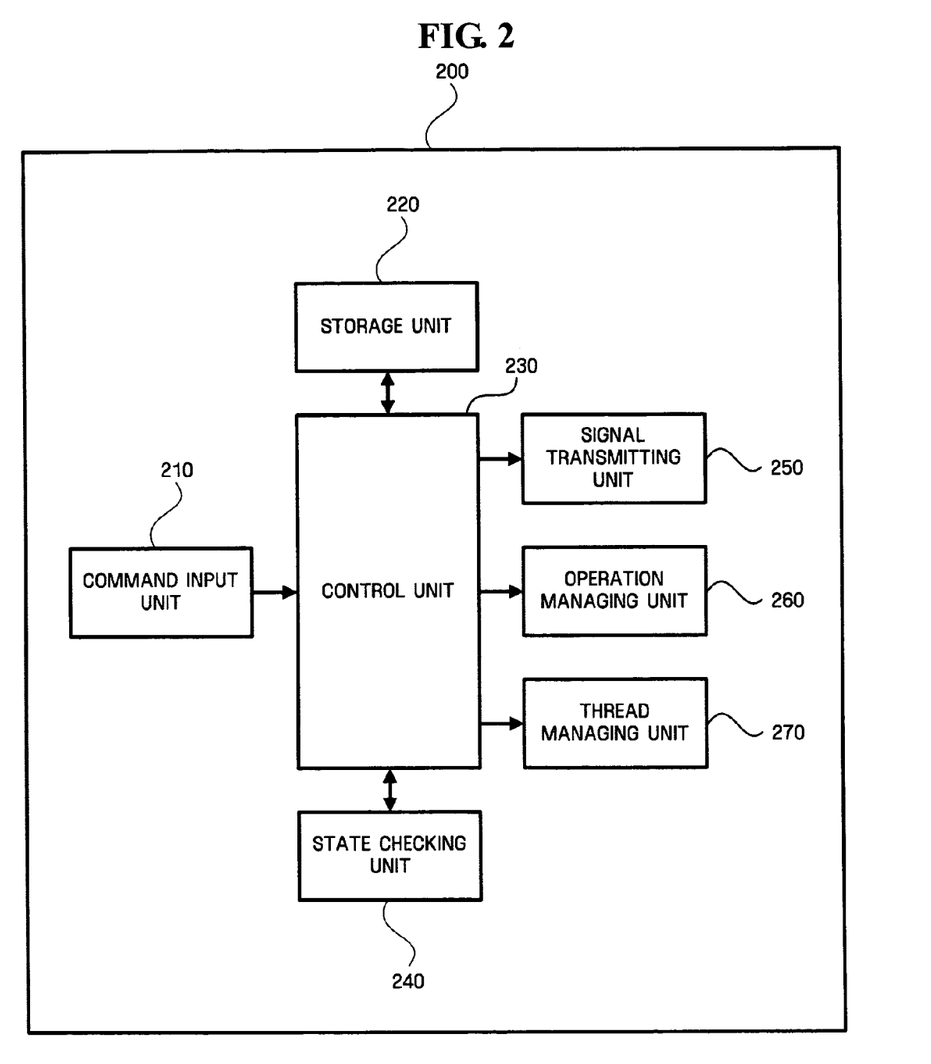
FIG. 2 is a block diagram showing an apparatus for forcibly terminating a thread blocked on an I/O operation according to an exemplary embodiment of the present invention.

FIG. 2 is a block diagram showing an apparatus for forcibly terminating a thread blocked on an I/O operation according to an exemplary embodiment of the present invention. An apparatus 200 for forcibly terminating a thread blocked on an I/O operation (hereinafter, simply referred as a "thread managing apparatus") includes a command input unit 210, a storage unit 220, a control unit 230, a state checking unit 240, a signal transmitting unit 250, an operation managing unit 260, and a thread managing unit 270.

The command input unit 210 receives an execution command for a predetermined operation that is included in a program code of an application. The received command may include, for instance, a command for operation execution or operation termination of the application. According to the exemplary embodiment under discussion, the application includes a Java application, and in particular, a Java application that includes a thread for an I/O operation.

The received command is converted into a control code for the corresponding command, which is then transmitted to the control unit 230. The control unit 230 updates a thread information table on the basis of the control code that is transmitted by the command input unit 210. That is, when the transmitted control code is a control code for the operation execution of an application, the control unit 230 updates the thread information table that is stored in the storage unit 220. A detailed description of an exemplary thread information table will be made below with reference to FIG. 3.

In addition, when the transmitted control code is a control code for the operation termination of an application, the control unit 230 checks states of threads that are included in the application that is requested to be terminated. At this time, the control unit 230 may refer to the thread information table stored in the storage unit 220, and may refer to information from the state checking unit 240.

The control unit 230 controls various essential units of the thread managing apparatus 200, such as the command input unit 210, the state checking unit 240, the storage unit 220, the signal transmitting unit 250, the operation managing unit 260, and the thread managing unit 270.

The state checking unit 240 serves to check states of threads that are currently being involved in an operation. That is, the state checking unit 240 checks the states of all of the threads that are included in one application. Further, the state checking unit 240 checks whether an operation is being performed by the threads or whether an operation performed by a corresponding thread is an I/O operation. According to the exemplary embodiment under discussion, information regarding a type of the target application is transmitted by the control unit 230. Further, a list of threads that are included in the application may be transmitted by the control unit 230.

In addition, when receiving a command from the control unit 230 for checking states of threads, which are included in a plurality of applications, the state checking unit 240 may perform operations on the plurality of applications at the same time.

The storage unit 220 stores the thread information table. The thread information table may include application identifiers, thread identifiers, states of threads, and the like. The detailed description of an exemplary thread information table will be made below with reference to FIG. 3.

The storage unit 220 is a module that allows input and output of information from sources including, but not limited to, a hard disc, a flash memory, a compact flash (CF) card, a secure digital (SD) card, a smart media (SM) card, a multi-media card (MMC), or a memory stick. Further, the storage unit 220 may be included in the thread managing apparatus 200 or may be provided in a separate apparatus.

The signal transmitting unit 250 transmits a signal for releasing a blocked state of the thread. According to the exemplary embodiment under discussion, the thread is a thread in a blocked state. The signal transmitting unit 250 receives a list of threads to be targeted from the control unit 230 and transmits signals to the threads included in the list. The transmitted signal is predetermined information that is exchanged between the threads. A thread which receives the signal performs a predetermined operation that corresponds to the transmitted signal.

The signal may be, for instance, a user-defined signal. A thread which receives the signal is temporarily released from the blocked state that results from an I/O operation. Such a blocked state includes a state wherein a system call is being performed in a kernel mode of the operating system. A temporary release from the blocked state refers to, for instance, a change from the kernel mode of the operating system to the user mode of the operating system.

The operation managing unit 260 executes a terminating function (hereinafter referred to as "a first terminating function") of the I/O operation that is included in the thread that is released from the blocked state by the signal that is transmitted by the signal transmitting unit 250. For example, when the I/O operation is a network operation that uses a socket, the operation managing unit 260 performs a terminating function of the socket. When the I/O operation is an I/O operation on files, the operation managing unit 260 executes a terminating function with respect to a file I/O operation.

As the first terminating function is executed, the thread that is temporarily released from the blocked state becomes unable to perform a system call again for an I/O operation. Therefore, the I/O operation that is included in the thread cannot return to the kernel mode but remains in the user mode.

When the first terminating function is executed, the operation managing unit 260 may receive information on the corresponding I/O operation from the control unit 230. The information on the I/O operation may include, but is not limited to, an application identifier, a thread identifier, a type of I/O operation, and the like.

The thread managing unit 270 executes a second terminating function of the thread whose I/O operation is terminated by the first terminating function. The second terminating function may include, but is not limited to, an interrupt function and a stop function. The interrupt function temporarily releases the blocked thread from the blocked state, and the stop function generates a ThreadDeath Exception. Specifically, the thread in the user mode is terminated by the second terminating function, such that the termination of the application is easily performed. When a thread is managed by a Java program code, the Thread.interrupt( ) function and the Thread.stop( ) function can serve as the interrupt function and the stop function, respectively.

When there are a plurality of threads that are included in the application, the plurality of threads may be sequentially or simultaneously terminated, as determined by the control unit 230. That is, referring to the thread information table, the control unit 230 may transmit a plurality of pieces of information regarding the plurality of threads included in the application to the signal transmitting unit 250, the operation managing unit 260, and the thread managing unit 270 at the same time. Further, the control unit 230 may transmit the plurality of pieces of information one at a time. When the pieces of information regarding the plurality of threads are transmitted one at a time, the control unit 230 performs the transmitting operation until the control unit 230 transmits the pieces of information regarding all of the threads that are included in the list. According to an exemplary embodiment of the present invention, the control unit 230 may delete the information from the thread information table, once the information is transmitted.

Figure 3:
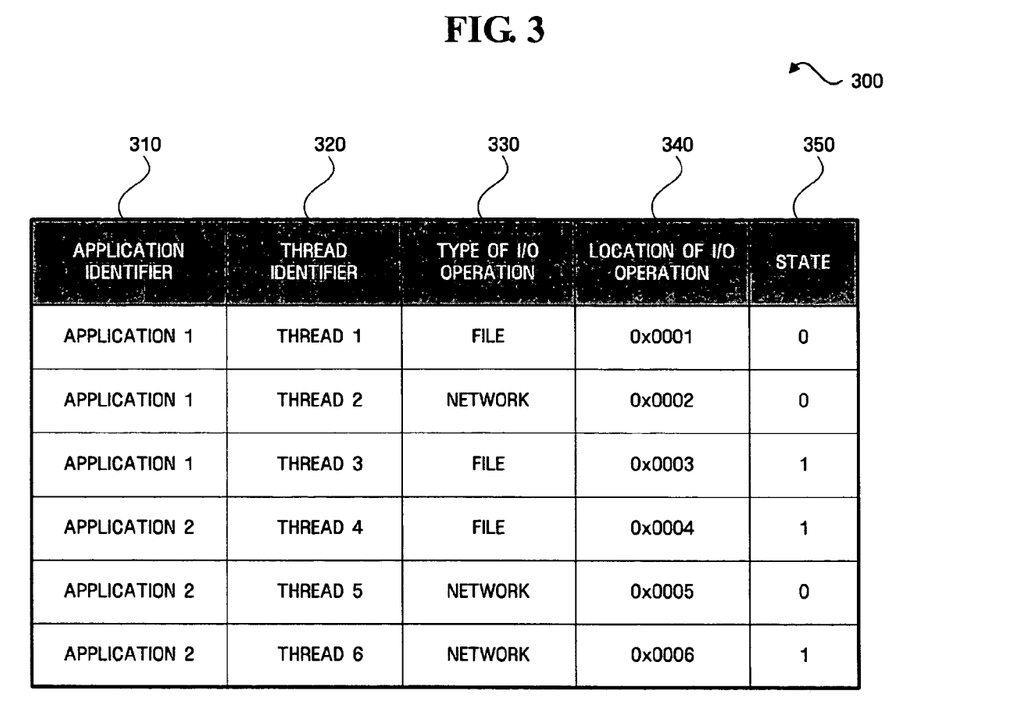
FIG. 3 is a diagram showing a thread information table according to an exemplary embodiment of the present invention.

FIG. 3 is a diagram showing a thread information table according to an exemplary embodiment of the present invention. A thread information table 300 includes an application identifier field 310, a thread identifier field 320, a type of I/O operation field 330, a location of I/O operation field 340, and a state field 350.

Unique identifiers of the applications are included in the application identifier field 310. The application identifier may be generated by using a registration order of applications or by a user's direct input.

The application identifier is used to designate a specific application. The signal transmitting unit 250, the operation managing unit 260, and the thread managing unit 270 can check a target application by using the application identifier.

Unique identifiers of threads are included in the thread identifier field 320. The thread identifiers may be generated by using a generation order of threads or by a user's direct input.

The thread identifier is used to designate a specific thread. The signal transmitting unit 250, the operation managing unit 260, and the thread managing unit 270 can check a target thread by using the thread identifier.

A plurality of threads may correspond to one application and be included in the thread information table 300.

An identifier that indicates a type of I/O operation included in the thread is included in the type of I/O operation field 330. For example, an identifier 1 may correspond to a file I/O operation, and an identifier 2 may correspond to a network I/O operation.

The identifier that indicates the type of I/O operation is transmitted to the operation managing unit 260. The operation managing unit 260 executes a first terminating function with respect to the corresponding I/O operation by using the transmitted identifier. That is, the operation managing unit 260 extracts and executes the first terminating function that corresponds to the type of the I/O operation.

A location of an object that performs an I/O operation included in the thread is included in the location of I/O operation field 340. That is, the location of the object is an address thereof and may be implemented by a pointer. For example, a file descriptor of the object may be inserted as a value of the location field 340.

The location of the object that performs the I/O operation is transmitted to the operation managing unit 260. The operation managing unit 260 executes a first terminating function with respect to the corresponding I/O operation by using the transmitted location of the object. That is, the location of the object that performs the I/O operation is inserted into a parameter of the first terminating function.

The state field 350 includes a flag that indicates whether or not a thread is blocked. For example, when the thread is not blocked, the flag may correspond to a value 0, and when the thread is blocked, the flag may correspond to a value 1.

According to an exemplary embodiment of the present invention, a state of a thread can be checked by using a type of a command that is input through the command input unit 210, or can be checked by the state checking unit 240. For example, when the command that is input by the command input unit 210 is an execution command with respect to the I/O operation, which needs a system call of an operating system, the control unit 230 updates the flag of the state field 350 as signifying a blocked state. When the command input by the command input unit 210 is a termination command with respect to the I/O operation, the control unit 230 updates the flag of the state field 350 to signify an unblocked state.

In addition, the corresponding I/O operation may be terminated by another application. Therefore, the state checking unit 240 may check the states of threads whenever necessary and notify the control unit 230 of the checked states of the threads.

Figure 4:
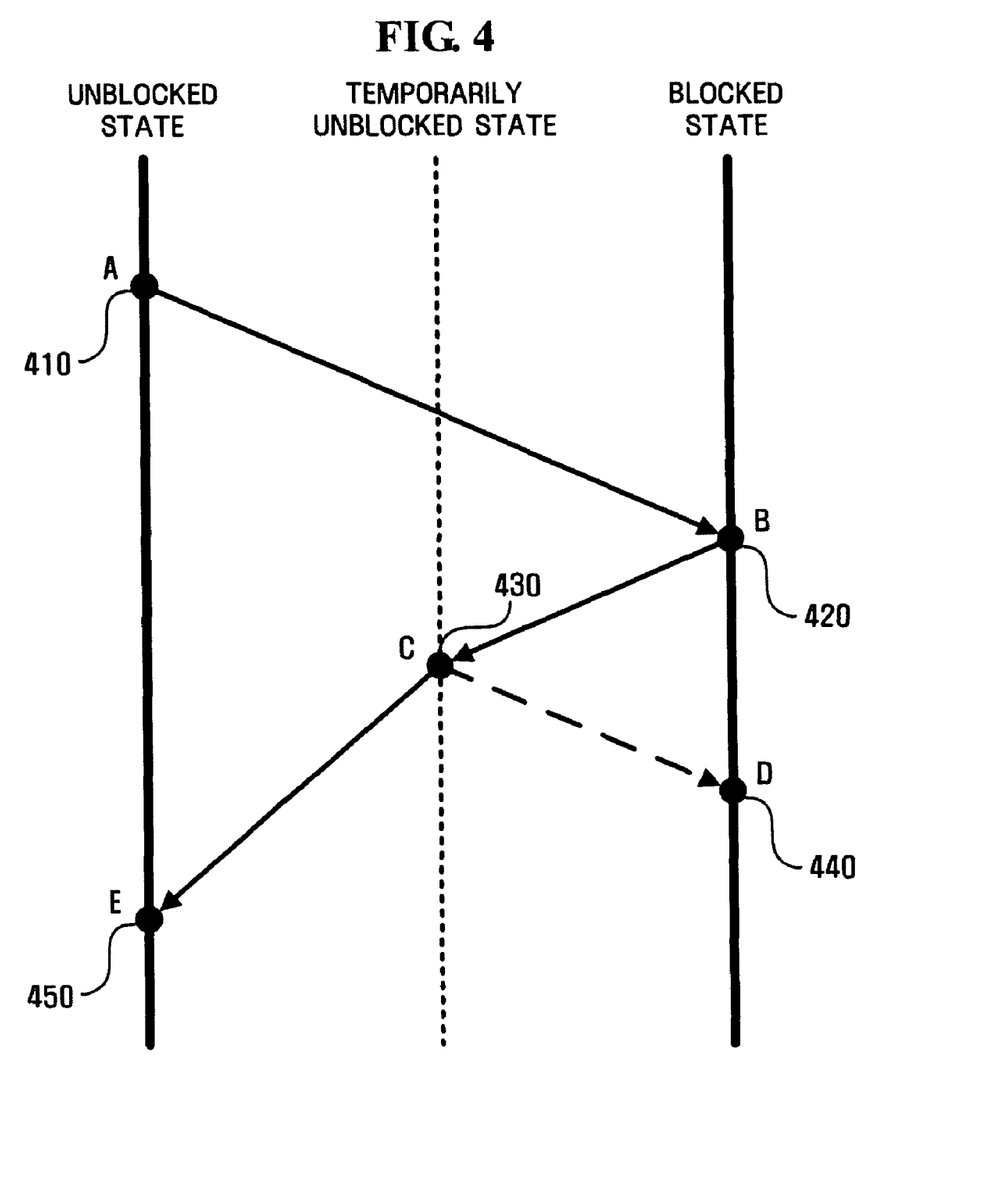
FIG. 4 is a conceptual diagram showing a state change of a thread according to an exemplary embodiment of the present invention.

FIG. 4 is a conceptual diagram showing a state change of a thread according to an exemplary embodiment of the present invention.

As shown in FIG. 4, a state A (410) is a state where blocking of a corresponding thread is released, that is, the state before a command for an I/O operation is input. When a command for an I/O operation is input, the thread that is included in the application performs a system call of an operating system according to the input command. However, since the system call is performed only in a kernel mode of the operating system, the state of the thread is changed into a state B (420), which is a blocked state.

When the thread is in the state B (420), if the second terminating function is executed, the thread is temporarily released from the blocked state by the interrupt function that is included in the second terminating function, and the thread moves to a state C (430). However, if the I/O operation that is included in the thread causes the system call to be performed so as to return the mode of the thread to the kernel mode, the state of the thread moves to a state D (440), which is a blocked state again.

Moreover, when the thread is in the state B (420), if a signal is transmitted by the signal transmitting unit 250, the thread is temporarily released from the blocked state and moves to the state C (430). At this time, the operation managing unit 260 executes the first terminating function in order to terminate the I/O operation. As a result, since it may be impossible to perform the I/O operation that is included in the thread, which is temporarily released from the blocked state, a return to the kernel mode is not performed, and the thread remains in the state C (430).

Further, when the thread is in the state C (430), the thread managing unit 270 may execute the second terminating function. As a ThreadDeath Exception is generated by the stop function that is included in the second terminating function, the thread is terminated and moves to a state E (450).

As shown in FIG. 4, when a command for terminating the application is input, the control unit 230 causes signals to be transmitted only to threads in the state B (420), and a terminate I/O operation function (the first terminating function) to be executed in the threads in the state B (420), by referring to the thread information table 300. Further, the control unit 230 causes only a thread terminating function (second terminating function) to be executed in threads in the state A (410) or the state C (430).

Figure 5:
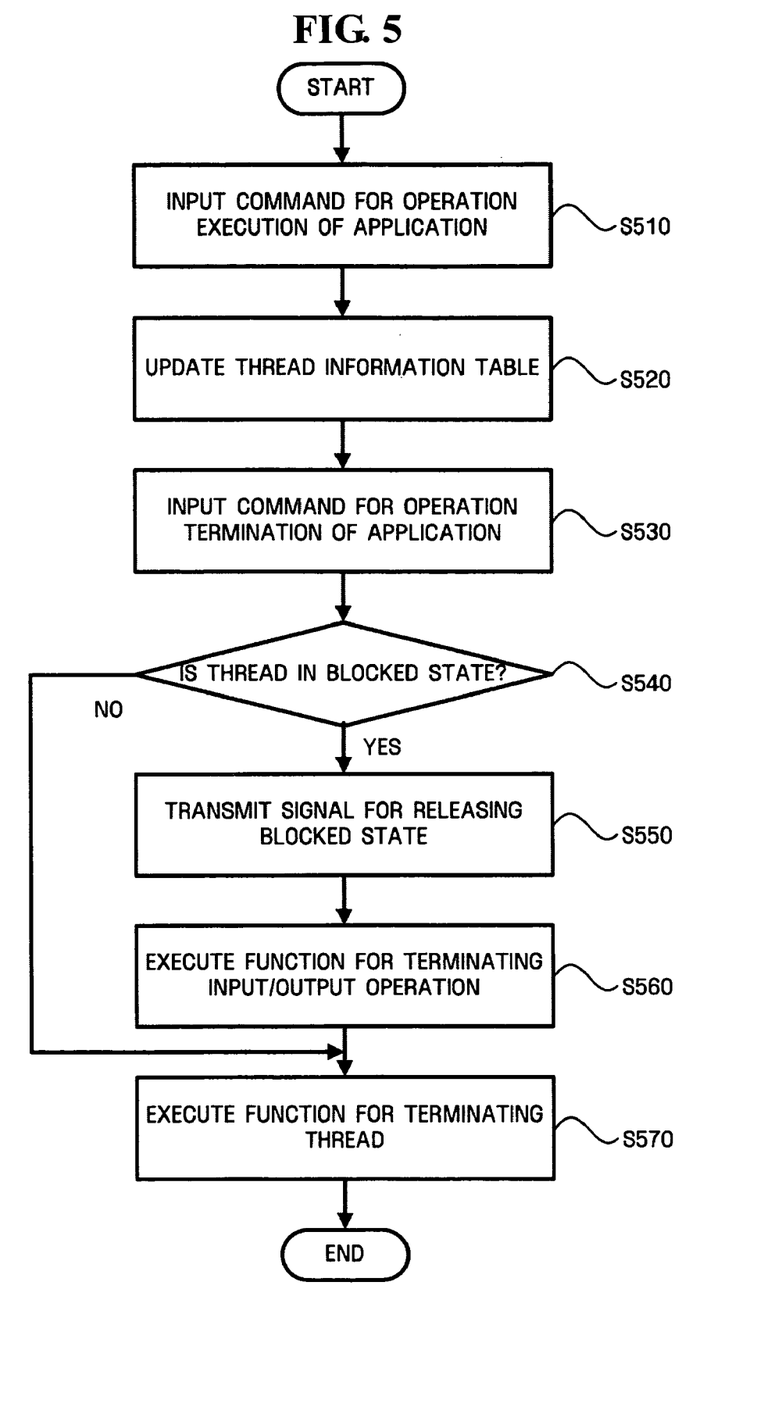
FIG. 5 is a flowchart illustrating a process of forcibly terminating a thread blocked on an I/O operation according to an exemplary embodiment of the present invention.

FIG. 5 is a flowchart illustrating a process of forcibly terminating a thread blocked on an I/O operation according to an exemplary embodiment of the present invention.

In order to forcibly terminate a thread that is blocked on an I/O operation, the command input unit 210 of the thread managing unit 200 receives a command for operation execution of the application (Operation S510). As a result, it is possible to perform the I/O operation that is included in the application. A control code for the received command is transmitted to the control unit 230, and the control unit 230 updates the thread information table 300 that is stored in the storage unit 220 (Operation S520). That is, a state of the thread that includes the corresponding I/O operation, from among threads of the application, is changed into a blocked state. The control unit 230 then causes the operation managing unit 260 to perform the corresponding I/O operation.

The command input unit 210 receives a command for operation termination of the application (Operation S530). A control code for the received command is transmitted to the control unit 230, and the control unit 230 checks whether the thread that is included in the corresponding application is in a blocked state or not (Operation S540). According to an exemplary embodiment of the present invention, the control unit 230 can check a state of the thread with reference to the thread information table 300 that is stored in the storage unit 220. Further, the control unit 230 can also check the state of the thread by using information that is transmitted by the state checking unit 240.

When the state of the thread is not the blocked state, the control unit 230 transmits an application identifier and a thread identifier to the thread managing unit 270. The thread managing unit 270 executes a terminating function (second terminating function) so as to terminate the corresponding thread, referring to the transmitted application identifier and thread identifier (Operation S570). As a result, the thread that is not in the blocked state is terminated by the second terminating function.

When the state of the thread is in the blocked state, the control unit 230 transmits the application identifier and the thread identifier to the signal transmitting unit 250. Then, the signal transmitting unit 250 transmits a signal for releasing the blocked state to the corresponding thread with reference to the transmitted application identifier and the thread identifier (Operation S550). As the signal is transmitted, the thread having received the signal is temporarily released from the blocked state that results from the I/O operation.

The control unit 230 transmits the application identifier, the type of I/O operation, and the location of the I/O operation to the operation managing unit 260. Referring to the transmitted information, the operation managing unit 260 executes a function (first terminating function) for terminating the I/O operation that is included in the thread (Operation S560). After the first terminating function is executed, it may be impossible for the thread that is temporarily released from the blocked state to perform a system call again for an I/O operation. That is, the I/O operation that is included in the thread remains in a user mode.

The control unit 230 transmits the application identifier and the thread identifier to the thread managing unit 270. The thread managing unit 270 having received the application identifier and the thread identifier executes the second terminating function that is a function for terminating the corresponding thread (Operation S570). As the second terminating function is executed, the corresponding thread is terminated.

The control unit 230 repeats the above-described processes with respect to each of the threads that are included in the corresponding operation, by referring to the thread information table 300, until all of the threads are terminated.

It will be understood that blocks in the accompanying block diagram of FIG. 2 and combinations of the operations in the flow chart of FIG. 5 can be performed by computer program instructions. These computer program instructions can be provided to processors of, for example, general-purpose computers, special-purpose computers, and programmable data processing apparatuses. Therefore, the instructions performed by the computer or the programmable data processing apparatus create means for executing functions described in the blocks in block diagrams or the operations in the flow charts. The computer program instructions can be stored in a computer available memory or a computer readable memory of the computer or the programmable data processing apparatus in order to realize the functions in a specific manner. Therefore, the instructions stored in the computer available memory or the computer readable memory can manufacture products including the instruction means for performing the functions described in the blocks in the block diagrams or the operations in the flow charts. Also, the computer program instructions can be loaded onto the computer or the computer programmable data processing apparatus. Therefore, a series of operational steps can be performed in the computer or the programmable data processing apparatus to generate a process executed by the computer, which makes it possible for the instructions operating the computer or the programmable data processing apparatus to provide steps of executing the functions described in the blocks of the block diagram or the operations of the flow chart.

Each block or each operation may indicate a portion of a code, a module, or a segment including one or more executable instructions for performing a specific logical function (or functions). It should be noted that, in some exemplary modifications of the present invention, the functions described in the blocks or the operations may be generated out of order.

For example, two blocks or operations continuously shown can actually be performed at the same time, or they can be performed sometimes in reverse order according to the corresponding functions.

Although the present invention has been described in connection with the exemplary embodiments of the present invention, it will be apparent to those skilled in the art that various modifications and changes may be made thereto without departing from the scope and spirit of the invention. Therefore, it should be understood that the above exemplary embodiments are not limitative, but illustrative in all aspects.

According to the apparatus and method for forcibly terminating a thread blocked on an I/O operation and the method for terminating the same, the following aspects can be obtained, as well as other aspects not listed below. Further, the present invention is not required to obtain the aspects described below, and an illustrative, non-limiting embodiment of the present invention may not overcome any of the problems described below.

First, as a thread that is blocked on an I/O operation is forcibly terminated, an application that includes the corresponding thread is quickly terminated.

Second, since resources that are allocated to an application can be quickly retrieved, waste of resources is reduced.

What is claimed is:

1. An apparatus for forcibly terminating a thread blocked on an input/output (I/O) operation, the apparatus comprising:
   a processor forcibly terminating the thread;
   a control unit which checks a state of the thread that is included in an application;
   a signal transmitting unit which transmits a signal for releasing a blocked state of the thread, wherein the blocked state comprises a state of performing a system call in a kernel mode of an operating system;
   an operation managing unit which executes a first terminating function on an I/O operation that is included in the thread, wherein the first terminating function changes the kernel mode of the operating system to a user mode of the operating system; and
   a thread managing unit which executes a second terminating function on the thread in the user mode of the operating system.

2. The apparatus of claim 1, wherein the application comprises a Java application.

3. The apparatus of claim 1, wherein the thread managing unit generates a
   ThreadDeath Exception with respect to the thread.

4. The apparatus of claim 1, wherein at least one of the signal, the first terminating function, and the second terminating function is executed using a table that comprises the state of the thread.

5. The apparatus of claim 4, further comprising a storage unit which stores the table.

6. The apparatus of claim 1, wherein the second terminating function comprises:
   an interrupt function; and
   a stop function.

7. The apparatus of claim 6, wherein the interrupt function temporarily releases the thread from the blocked state; and
   wherein the stop function generates a ThreadDeath Exception with respect to the thread.

8. The apparatus of claim 1, wherein the operation managing unit executes the first terminating function on the I/O operation that is included in the thread that is released from the blocked state.

9. The apparatus of claim 8, wherein the thread managing unit executes the second terminating function on the thread whose I/O operation is terminated by the first terminating function.

10. A method for forcibly terminating a thread blocked on an input/output (I/O) operation, the method comprising:
    checking a state of the thread that is included in an application;
    transmitting a signal for releasing a blocked state of the thread, wherein the blocked state comprises a state of performing a system call in a kernel mode of an operating system;
    executing a first terminating function on the I/O operation that is included in the thread, wherein the first terminating function changes the kernel mode of the operating system to a user mode of the operating system; and
    executing a second terminating function on the thread in the user mode of the operating system.

11. The method of claim 10, wherein the application comprises a Java application.

12. The method of claim 10, wherein the executing of the second terminating function comprises generating a ThreadDeath Exception with respect to the thread.

13. The method of claim 10, wherein at least one of the signal, the first terminating function, and the second terminating function is executed using a table that comprises the state of the thread.

14. The method of claim 13, further comprising storing the table.

15. The method of claim 10, wherein the first terminating function is executed on the I/O operation that is included in the thread that is released from the blocked state by the signal.

16. The method of claim 15, wherein the second terminating function is executed on the thread whose I/O operation is terminated by the first terminating function.

17. The method of claim 10, wherein the executing a first terminating function on an I/O operation comprises:
    extracting a type of the I/O operation; and
    executing a terminating function corresponding to the type of the I/O operation.

* * * * *